US00RE33927E

United States Patent [19]

Fuzimura

[11] E Patent Number: Re. 33,927

[45] Reissued Date of Patent: May 19, 1992

[54] AIR CLEANER

[75] Inventor: Yasuyuki Fuzimura, Zushi, Japan

[73] Assignee: Kankyo Company Limited, Kanagawa, Japan

[21] Appl. No.: 407,613

[22] Filed: Sep. 15, 1989

Related U.S. Patent Documents

Reissue of:

[64] Patent No.: 4,693,733
Issued: Sep. 15, 1987
Appl. No.: 905,152
Filed: Sep. 9, 1986

[30] Foreign Application Priority Data

Nov. 8, 1985 [JP] Japan ..... 60-170871
Nov. 11, 1985 [JP] Japan ..... 60-172384

[51] Int. Cl.[5] ..... B03C 3/36

[52] U.S. Cl. ..... 55/129; 55/137; 55/138; 55/145; 55/146; 55/151; 55/154; 55/274

[58] Field of Search ..... 55/128-130, 55/137, 138, 143, 145, 146, 151, 154, 274

[56] References Cited

U.S. PATENT DOCUMENTS

| | | | |
|---|---|---|---|
| 2,097,233 | 10/1937 | Meston | 55/154 X |
| 2,776,724 | 1/1957 | Goldschmied | 55/138 X |
| 2,822,058 | 2/1958 | Roos et al. | 55/137 X |
| 2,868,318 | 1/1959 | Perkins et al. | 55/146 X |
| 2,871,974 | 2/1959 | Werst | 55/130 |
| 2,974,747 | 3/1961 | Coolidge, Jr. et al. | 55/130 |
| 3,400,513 | 9/1968 | Boll | 55/146 X |
| 3,483,672 | 12/1969 | Jahnke | 55/146 |
| 3,520,172 | 7/1970 | Liu et al. | 55/129 X |
| 3,740,925 | 6/1973 | Gothard | 55/128 X |
| 3,827,217 | 8/1974 | Volsy | 55/128 X |

*Primary Examiner*—Charles Hart
*Attorney, Agent, or Firm*—Birch, Stewart, Kolasch & Birch

[57] ABSTRACT

An air cleaner of the type utilizing the corona discharge phenomenon, which cleaner has a greater dust-collecting capacity and which does not stain a wall even if the cleaner is installed along the wall. The air cleaner of the present invention comprises a substrate, a pair of anodes mounted on the substrate, a cathode mounted on the substrate and interposed between the pair of anodes, a cover mounted on the substrate, which covers the pair of anodes and the cathode, the cover having an inlet formed in the region near from the cathode and a pair of outlets formed in the region near from the pair of anodes. The inlet and the pair of outlets are arranged such that when a negative and positive voltage is applied to the cathode and the pair of anodes, respectively, air is inhaled into the cavity defined by the substrate and the cover from the inlet and is vented therefrom through the pair of outlets.

9 Claims, 3 Drawing Sheets

AIR CLEANER

Matter enclosed in heavy brackets [ ] appears in the original patent but forms no part of this reissue specification; matter printed in italics indicates the additions made by reissue.

BACKGROUND OF THE INVENTION

I. Field of the Invention

This invention relates to an air cleaner which collects small dusts or particles in the air.

II. Description of the Prior Art

Conventional air cleaners include filter type air cleaners and electrostatic type air cleaners. Both types include a fan to inhale ambient air into the body of the cleaner to catch the dust in the air with a filter or an electrode. However, in those air cleaners using a fan, noise is generated by the fan. If the revolution of the fan is decreased to reduce the noise, the dust-collecting capacity of the air cleaner is also reduced accordingly.

An air cleaner which does not include a fan has been developed. This air cleaner utilizes the "corona discharge" phenomenon. This air cleaner includes a cathode and an anode, and a high voltage is applied to the electrodes. Electrons are emitted from the cathode to give the dust or other particles in the air negative charge. The negatively charged dust or particles are attracted to the anode and trapped by the anode, thus removing the dust or particles in the air. Since the negatively charged dust or particles flow from the cathode to the anode, an air flow which is so called "ion wind" is generated. In the conventional air cleaner of this type, the cathode and the anode are so arranged as to face each other. Thus, the ion wind blows in one direction, i.e., from the cathode to the anode. With this arrangement, if the air cleaner is placed along a wall (this type of air cleaner is usually placed along a wall), the air flow entering the air cleaner flows substantially parallel to the wall, thus staining the wall because the air flow entering the air cleaner contains dust or particles. Further, with this arrangement, the lines of electric force are substantially linear, i.e., they are generated from the cathode to the anode in substantially linear shape. Therefore, the air cleaner can collect the dust in only a limited area, and so the air-collecting power of the air cleaner is not satisfactory.

SUMMARY OF THE INVENTION

Accordingly, the object of the present invention is to provide an air cleaner of the type which utilizes the corona discharge phenomenon, which air cleaner does not stain a wall even if the air cleaner is installed along the wall.

Another object of the present invention is to provide an air cleaner of which dust-collecting capacity is greater than the conventional air cleaners.

These and other objects of the present invention can be accomplished by providing an air cleaner comprising a substrate; a pair of anodes mounted on the substrate; a cathode mounted on the substrate and interposed between the pair of anodes, the cathode being insulated from the pair of anodes; a cover mounted on the substrate which covers the pair of anodes and the cathode; an inlet formed in the region of the cover, which is near from the cathode; and a pair of outlets formed in the region of the cover, which are near from the pair of anodes, respectively. The inlet and the pair of outlets are arranged such that when a negative and positive voltage is applied to the cathode and the pair of anodes, respectively, air is inhaled into the cover from the inlet and is vented from the cover through the pair of outlets.

With the air cleaner of the present invention, since air is inhaled from the inlet interposed between the pair of outlets, the dusty air does not flow along a wall even if the air cleaner is installed along the wall, so that the wall is not stained. Further, according to the air cleaner of the present invention, since the lines of electric force extend over a large area and so the dust or particles in the large area are negatively charged, the dust-collecting capacity is great.

DETAILED DESCRIPTION OF THE PREFERRED EMBODIMENTS

Figure 1:
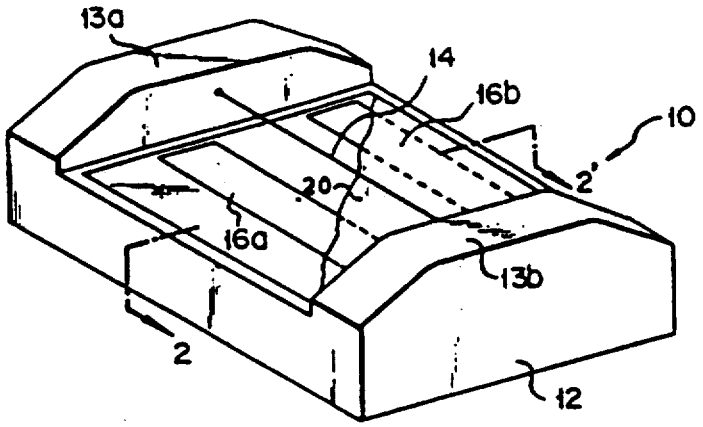
FIG. 1 shows a schematic perspective view of an embodiment of the air cleaner of the present invention (cover not shown)

Referring to FIG. 1, the air cleaner 10 of the present invention includes a substrate 12. The substrate 12 has a pair of walls 13a and 13b on the opposite sides thereof. The substrate 12 may preferably be made of an insulating material such as plastic materials. A pair of anodes 16a and 16b are mounted on the substrate 12. In the embodiment shown in FIG. 1, the anodes are in the form of a rectangular plate of a conductive material such as a metal. A cathode 14 of substantially linear shape made of a conductive material such as a metal is stretched across the side walls 13a and 13b, and inbetween the pair of anodes 16a and 16b. FIG. 1 does not show a cover for the purpose of simplicity of the figure.

Figure 2:
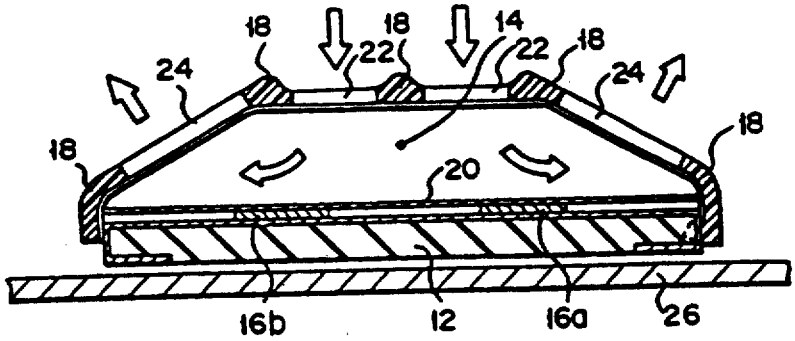
FIG. 2 shows a cross-sectional view taken along 2—2' line in FIG. 1 and further shows a cover of the air cleaner.
Figure 3:
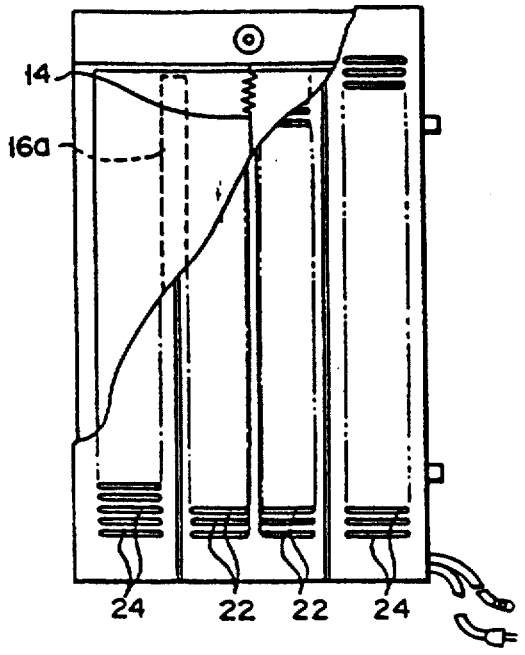
FIG. 3 shows an outer appearance of a cover of an embodiment of the air cleaner of the present invention.

FIG. 2 is a cross sectional view taken along the line 2—2' in FIG. 1, but further shows the cover 18. As stated above, on the substrate 12, a pair of anodes 16a and 16b are mounted. According to the preferred embodiment shown in FIG. 2, although not essential, a dust-collecting sheet 20 is placed on the pair of anodes 16a and 16b. Dust-collecting sheet 20 may be a sheet of paper. A cover 18 is placed on the substrate and covers the pair of anodes 16a and 16b, and the cathode 14. According to the preferred embodiment shown in FIG. 2, the cross sectional shape of the cover is trapezoid Inlets 22 are formed in the portion of the cover 20 near the cathode 14. In the preferred embodiment shown in FIG. 2, the inlets 22 are in the form of a pair of rows of a plurality of slits shown in FIG. 3. The inlets 22 may also preferably be a number of small holes. The cover 18 has a pair of outlets 24 in the portion of the cover 18 which is near from the anodes 16a and 16b, respectively. According to the preferred embodiment shown in FIG. 2, the outlets 24 are also in the form of a plurality of slits as shown in FIG. 3, and may also preferably be a number of small holes. By providing the inlets 22 and outlets 24 in the form of a plurality slits or small holes, unintentional touch of a human body to the high voltage cathode or anodes may be prevented.

In operation, a high voltage is applied between the cathode 14 and the anodes 16a and 16b from a DC voltage source (not shown). The voltage applied to the cathode 14 may be, for example, −8,000 volts, and that applied to the anodes 16a and 16b may be, for example, +8,000 volts. Such a high voltage causes corona discharge between the cathode 14 and the anodes 16a and 16b, and the dust or the particles near the cathode 14 are negatively charged by the electrons emitted from the cathode 14. The negatively charged dust or particles are attracted to the anodes 16a and 16b and trapped by the dust-collecting sheet 20 placed on the anodes 16a and 16b. Since the dust or particles near the cathode 14 move to the dust-collecting sheet 20, an air flow, so called "ion wind" is generated by the movement of the dust or the particles. The air flow is shown by the arrows in FIG. 2. That is, air is inhaled into the cavity defined by the cover 18 and the substrate 12 through the inlet 22 and vented from the cavity through the pair of outlets 24. As seen from FIG. 2, since the dusty air comes from the direction parpendicular to the substrate 12, even if the air cleaner 10 is installed along a wall 26, the wall 26 is not stained by the dusty air flow. Needless to say, however, the air cleaner of the present invention need not be installed along the wall, but may also be installed on a ceiling or may be just left to stand in a space in a room or the like.

Figure 4:
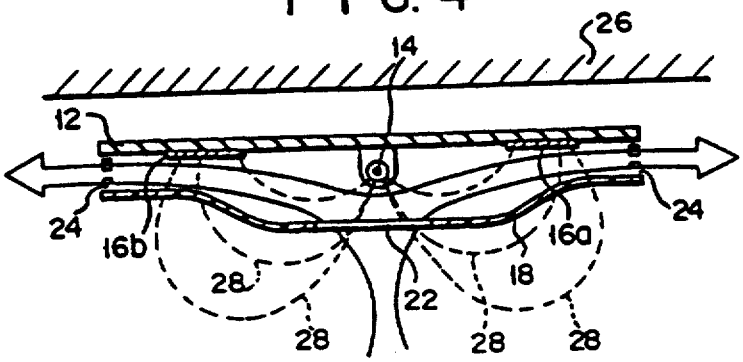
FIG. 4 shows the lines of electric force generated in operation.

The lines of electric force generated in the air cleaner of the present invention are shown in FIG. 4. As seen from FIG. 4, the lines of electric force 28 (shown by broken lines) extend over a large area. Thus, the dust in the large area can be collected, so that the dust-collecting-capacity of the air cleaner of the present invention is much greater than the conventional air cleaners.

Figure 5:
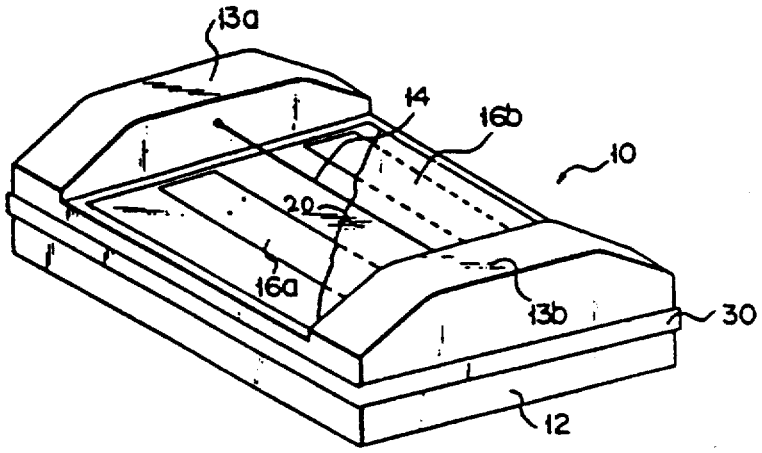
FIG. 5 shows a modification of the embodiment of the air cleaner of the present invention shown in FIG. 1.
Figure 6:
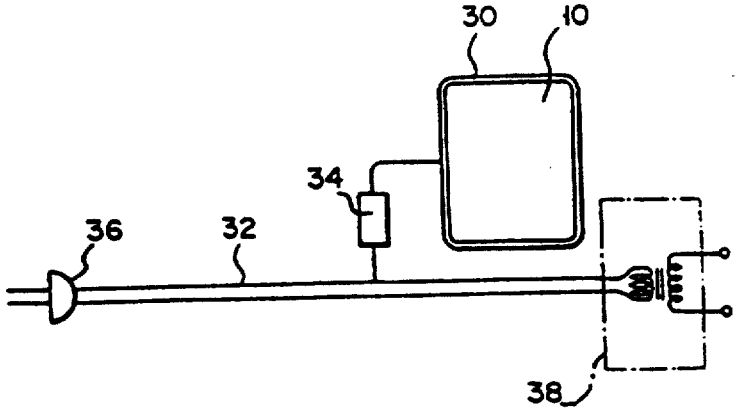
FIG. 6 shows a schematic electric circuit adopted in the embodiment shown in FIG. 5.

Another preferred modification of the air cleaner of the present invention is shown in FIG. 5. The air cleaner shown in FIG. 5, in addition to the parts shown in FIGS. 1 and 2, further contains a tape 30 made of a conductive material. As shown in FIG. 6, the tape 30 is connected to the primary circuit 32 (the one which has a plug 36) of the high voltage source 38 through a resistor 34.

With this arrangement, the static electricity accumulated in the substrate 12 and the cover 18 escapes to the primary circuit of the high voltage supply, thus preventing the electric shock when a person touches the cover or the substrate.

As described above in detail, according to the present invention, an air cleaner which does not stain the wall and which has a great dust-collecting capacity was obtained. The air cleaner of the present invention can collect dust or particles of as small as 0.1 to 3 micrometers diameter. Thus, the air cleaner of the present invention can collect not only dust, but also bacteria, pollens, cigarette smoke and the like. Thus, the air cleaner of the present invention may be very helpful to hospitals and high-tech factories such as semiconductor manufacturing factories.

Although the present invention was described referring to a preferred specific embodiment, it should be understood that a number of obvious modifications, ommission and addition without departing from the spirit or scope of the present invention may be apparent to those skilled in the art, and the scope of the present invention should be determined by the appended claims.

I claim:

1. An air cleaner comprising:

a substrate;

a pair of anodes mounted on the substrate;

a cathode mounted on the substrate and interposed between the pair of anodes, the cathode being insulated from the pair of anodes; and a cover mounted on the substrate which covers the pair of anodes and the cathode, the cover having an inlet formed in the region of the cover, which is near from the cathode, and the cover having a pair of outlets formed in the region of the cover, which are near from the pair of anodes, respectively;

the inlet and the pair of outlets being arranged such that when a negative and positive voltage is applied to the cathode and the pair of anodes, respectively, air is inhaled into the cavity defined by the cover and the substrate from the inlet and is vented from the cavity through the pair of outlets.

2. The air cleaner of claim 1, wherein the cathode has a substantially linear shape.

3. The air cleaner of claim 1, wherein the substrate has a pair of side walls on opposite sides, and the cathode is stretched across the side walls.

4. The air cleaner of claim 1, wherein the anodes have a substantially planar shape.

5. The air cleaner of claim 1, wherein the cathode is of a substantially linear shape, the anodes have a substantially planar shape, and the cathode and the anodes are arranged substantially in parallel.

6. The air cleaner of claim 1, wherein each of the anodes is covered with a dust-collecting paper.

7. The air cleaner of claim 1, wherein the cover is made of a transparent material.

8. The air cleaner of claim 1, wherein the inlet and the outlets are in the form of a plurality of slits.

9. The air cleaner of claim 1, wherein the inlet and the outlets are in the form of a plurality of holes.

* * * * *